(12) United States Patent
Ord et al.

(10) Patent No.: US 7,520,301 B2
(45) Date of Patent: Apr. 21, 2009

(54) BLOCKING ASSEMBLY

(75) Inventors: Richard Ord, Auckland (NZ); Colleen Mary Fenton, Auckland (NZ)

(73) Assignee: Crucible 1 Trust, Auckland (NZ)

( * ) Notice: Subject to any disclaimer, the term of this patent is extended or adjusted under 35 U.S.C. 154(b) by 0 days.

(21) Appl. No.: 11/666,668

(22) PCT Filed: Nov. 1, 2005

(86) PCT No.: PCT/NZ2005/000286

§ 371 (c)(1), (2), (4) Date: Jun. 28, 2007

(87) PCT Pub. No.: WO2006/049509

PCT Pub. Date: May 11, 2006

(65) Prior Publication Data

US 2007/0246115 A1     Oct. 25, 2007

(30) Foreign Application Priority Data

Nov. 1, 2004     (NZ) .................................... 536269

(51) Int. Cl.
*F16L 55/12* (2006.01)
(52) U.S. Cl. .......................................... 138/93; 138/89
(58) Field of Classification Search .................. 138/93, 138/89
See application file for complete search history.

(56) References Cited

U.S. PATENT DOCUMENTS

| 4,458,721 | A | * | 7/1984 | Yie et al. ...................... 138/93 |
| 4,614,206 | A | * | 9/1986 | Mathison et al. .............. 138/93 |
| 5,076,328 | A | * | 12/1991 | Lyon ........................... 138/93 |
| 5,234,034 | A |   | 8/1993 | Lyon ........................... 138/93 |
| 5,240,031 | A | * | 8/1993 | Vigil ...................... 137/315.01 |
| 5,427,153 | A | * | 6/1995 | Tash ............................ 138/93 |
| 5,503,188 | A |   | 4/1996 | Petrone ....................... 138/93 |
| 5,867,547 | A | * | 2/1999 | Lee ............................ 376/204 |
| 6,263,896 | B1 | * | 7/2001 | Williams ................. 137/15.15 |
| 6,581,620 | B2 | * | 6/2003 | Babcock et al. .......... 137/15.15 |
| 2004/0144439 | A1 |   | 7/2004 | Lundman ..................... 138/93 |

* cited by examiner

*Primary Examiner*—Patrick F Brinson
(74) *Attorney, Agent, or Firm*—Young & Thompson

(57) ABSTRACT

There is a need for people who handle hazardous materials to be able to effectively and efficiently block cesspits and/or pipes of various drainage systems in circumstances of for example, a chemical or liquid spill or a gas leak so as to prevent or limit flow of the same into for example, the water table. This problem is solved through the use of a man made fluid inlet or outlet passage, blocking assembly having an inflatable bladder operatively linked to a fluid communication element, one aspect of the element being adapted to receive a pressurised fluid supply wherein, when a pressurised fluid passes through the fluid communication element, the bladder is adapted to inflate to block the passage in a fluid type manner.

8 Claims, 8 Drawing Sheets

BLOCKING ASSEMBLY

TECHNICAL FIELD OF THE INVENTION

This invention relates to a blocking assembly for blocking man-made inlets or outlets in particular, but not exclusively to blocking assemblies for blocking drains, cesspits, drainage holes, pipes, ventilation and/or air-conditioning shafts.

BACKGROUND ART KNOWN TO THE APPLICANT

There is a need in the chemical, pulp and paper, refinery and dairy industries, and for road cleaners, the emergency services and plumbers and people who handle hazardous materials to be able to effectively and efficiently block cesspits and/or pipes of various drainage systems in circumstances of for example, a chemical or liquid spill or a gas leak so as to prevent or limit flow of the same into for example the water table.

In terms of chemical spillages or flood water, this has been achieved in the past either through the use of floating booms or lead weighted mats or the like designed to span the entrance to stormwater drains. Such conventional systems are clearly however of limited value.

OBJECT

It is therefore an object of the present invention to provide a blocking assembly of greater value or which will at least provide the public with a useful choice. Although the invention is embodied in several different aspects, it will be clear from this broad background review that each aspect is so linked as to form part of same inventive concept.

STATEMENTS OF THE INVENTION

A man made fluid inlet or outlet passage, blocking assembly comprising an inflatable bladder operatively linked to a fluid communication means, one aspect of the means being adapted to receive a pressurised fluid supply wherein, when a pressurised fluid passes through the fluid communication means, the bladder is adapted to inflate to block the passage in a fluid type manner.

Such an assembly tends to provide a blocking assembly of better value because in principal, if the inlet or outlet passage is blocked by the bladder in this way, then any fluid pressure acting on the bladder from for example, a chemical spill, will increase the pressure within the bladder.

This increase in pressure will cause the passage wall contacting portion of the bladder to "grip" the passage wall more vigorously thus limiting any leakage of the chemical spill through the fully actuated blocking assembly to an absolute minimum.

In some cases it also means that the spill will be completely contained within a hole where it has collected (e.g. a storm drain) and hence be ready for disposal rather than being dispersed over or absorbed across the ground which involves expensive clean up and disposal costs. If it is contained in the hole, all that is required is a pump to pump the contained spill into a number of drums for disposal which is a far cheaper option.

Preferably, the bladder is provided with means adapted to assist in maintaining its structural integrity once inflated. It is to be appreciated that the wall of a passageway that the inflated bladder contacts in use when inflated will provide structural integrity to that portion of the inflated bladder but the free ends of the inflated bladder will have no such support.

If the means are absent, the integrity of the inflated ladder at the unsupported ends (due to the pressure of the gas in the bladder) may deteriorate and cause the bladder to continue to expand along the longitudinal axis of the passageway. If this were to occur, the "grip" of the bladder on the walls of the passageway may eventually weaken to the point where the inflated bladder is no longer able to hold back the pressure or head fluid in the passageway.

These means could be external means in the form of a thickened portion of the bladder at one or each end, a yolk or a reticulated housing for example, a wire mesh bag or a frangible casing used to house the bladder or the means could be internal means in the form of an internal bladder reinforcing member.

More preferably however, the means are internal means in the form of an internal bladder reinforcing member. The means may also be in the form of any appropriate selection or combination of the internal and external means described herein.

If the internal means is in the form of an internal bladder reinforcing member, then such a member may take the form of an apertured substantially cylindrical looking (once the bladder has been inflated) reinforcing member that is closed at both ends.

Each of these closed ends would be designed to be integral with respective free ends of the bladder the wall or walls of the internal 'cylinder' so formed operatively linking the free ends of the bladder together and thus providing additional support to maintain the structural integrity of the bladder.

The internal bladder reinforcing member may be provided with varying numbers of apertures that may be evenly spaced apart over the 'circumference' of the cylinder once formed. The number of apertures may depend upon the likely pressure of fluid that the inflated bladder in use has to be maintained against. For example, six apertures may be required for a height of water of up to 3.8 meters, four apertures for a height of water up to 2.6 meters and two apertures for a height of water up to 1.8 meters.

The diameter of the cylinder forming the internal bladder reinforcing member must be less than the smallest diameter of the man made fluid inlet or outlet passage. The diameters of such passageways are typically in the range of 150-300 mm, so the diameter of the cylinder has to be less than this, preferably 140 mm. In a preferred embodiment, the same sized bladder will be used for each size of passageway.

Storm drains commence at ground level and travel vertically downwards for several feet. Typically, at substantially right angles to and meeting with the wall of the storm drain below ground level is a circular entrance face of a columnar drainage pipe adapted to take water or other liquid fluid that has entered the storm drain away from the storm drain area to some other location.

Over the passage of time, grit, dirt, rubbish from previous heavy downpours will tend to accumulate within at least the floor of the entrance of the drainage pipe. In the event of a chemical spill, it would ordinarily be assumed that rapid deployment of the blocking assembly and rapid inflation of the bladder would be desired to minimise the risk of the chemical spill for example entering the water table.

Whereas rapid deployment of the blocking assembly (if portable) is indeed recommended, slow, (and not rapid inflation of the bladder) is preferred.

This is because with slow inflation of the bladder, the bladder has the opportunity to potentially push some of the rubbish out of the way which may otherwise pierce the bladder. Rapid inflation of the bladder may simply cause puncturing of the bladder because these objects may not be able to move away.

Of course, the blocking assembly need not only be used in the event of an emergency, it could be used simply to block the flow of fluid in a passageway to enable repairs "down-stream" of the passageway to be carried out.

Of the several means available to regulate the rate of inflation of the bladder preferably, the fluid communication means is fitted with a pressure restrictor adapted to regulate a flow of fluid through the fluid communication means when the flow is provided by a pressurised fluid supply.

Preferably, the fluid communication means is extendable. This will enable the bladder to be positioned correctly in a man-made passage way, (if the passage way is either below ground or a long way above ground {e.g. a ventilation shaft}) without the need for the use of additional equipment such as a ladder.

There are several ways in which the communication means could be made extendable, for example, the communication means could be in the form of a series of pipes of a substantially fixed length that are not designed to be telescopically extendible.

Such pipes could be connected together in a similar manner to that of a "chimney sweep" brush or via a "quick connect" system. The pipes could also conceivably fold out like a blind person's cane or an extendible/collapsible ruler. Alternatively, and more preferably, the fluid communication means is extendable telescopically.

The fluid communication means could be formed from a plurality of elongate pipes adapted to operatively engage when connected together, such that once so connected, at least two pipes are locked together to the extent that rotation about the primary axis of the communication means by a single member of the connected pipes causes rotation in the same direction of at least one of the other connected pipes. This could be the case even if the communication means were telescopically extendible or not.

It may be that the pipes are so adapted that rotation of a first pipe will cause rotation of a pipe directly adjacent to it when connected thereto.

In this case, if adjacent connected pipes were so adapted as to be each provided with a pair of complementary co-operating members adapted to engage with each other either directly or indirectly when the pipes were connected, then if they were engaged directly, rotation of the first pipe will cause substantially immediate rotation of the adjacent pipe.

However, if engagement is indirect, rotation of the first pipe possibly through substantially 360 degrees may be required before the co-operating members "align" and cause the connected pipe to rotate.

Preferably, rotary action of the or each connected pipe when a single member of the connected pipes is rotated occurs.

Preferably, the assembly is fitted with a non-return valve (NRV). Typically, this would be advantageous when using the assembly in connection with Breathing Apparatus (BA) cylinders as used and employed by members of the Emergency Services activating the assembly. This is because the BA system will be removed after being used to fill the bladder to the correct pressure (a pressure relief valve {vide infra} ensuring this) and after removal of the BA, the NRV will prevent the bladder from suddenly deflating.

If the bladder is placed in a ventilation shaft and activated by the emergency services to prevent the escape of for example, sarin gas as used by terrorists on the Japanese underground, it is essential to know that the bladder has not been over filled with pressurised fluid as the bladder may burst rendering the deployment of the blocking assembly in such a situation a complete waste of time.

Therefore, preferably, the blocking assembly is fitted with a pressure relief valve. Such a pressure relief valve will ensure that the bladder cannot be over inflated. In use and as mentioned previously, the assembly bladder will be deployed in passageways that range from typically 150 mm in diameter to at least 300 mm and possibly even 500 mm in diameter. With such a range of diameters, the pressure relief valve could be set to activate in the range of 6-20 Pounds per Square Inch (PSI).

With such a range, different passageway sizes could be more than adequately dealt with but the Applicant believes that one PSI setting in particular could deal with all of the passageway diameters mentioned above and so more particularly, the PSI setting for the pressure relief valve will be substantially 8 PSI.

For diameters of 150 mm, the pressure relief valve set at 8 PSI will definitely operate, but as the diameter size increases, the chances that it will operate to the same extent decrease as the PSI within the inflated bladder will decrease and it may not operate at all for the larger diameters. Fortunately, the bladder will operate adequately at 6 PSI for most emergencies.

Of course, the blocking assembly could be supplied as one complete unit with its own pressurised fluid supply. Alternatively, the blocking assembly could simply be supplied with a fluid communication means that is adapted to receive a pressurised fluid supply from, for example a BA gas cylinder as used by the Emergency Services and as located on or in their vehicles.

If the assembly is supplied with its own pressurised fluid supply, the type of supply could be a small conventional cylinder or a purpose designed and shaped cylinder. It could be "C" or "Horse-shoe" shaped cylinder to enable the assembly to fit within a housing, or to enable the assembly to be carried more easily.

Preferably however, the assembly is fitted with a pressurised fluid supply.

The fluid supply could be a gas or a foam. If it is the former, the gas could be air or Carbon dioxide, nitrogen or any appropriate selection or combination of known gases.

Preferably, the bladder is provided with and maintained substantially within a protective cover, thus preventing potential damage to the bladder when it is not being used or is in transit.

More preferably, the protective cover is designed to be frangible and as a result will break apart upon inflation of the bladder.

The blocking assembly could be provided with a direct actuation mechanism for example, a directly or indirectly hand operable switch, or electrical wiring "hard wired" directly to the assembly and actuable by pressing a switch to complete the electrical circuit.

However, preferably the blocking assembly is provided with an actuation mechanism that is adapted to be remotely operable. Such mechanisms could be in the form of electro-magnetic signals (e.g. radio or microwave) and would be considered to be indirect actuation mechanisms.

The bladder is likely to be fitted with a valve that is operatively connected to or is operatively connectable to the communication means. The bladder itself could be any shape in its un-inflated state. Preferably however, the bladder in its un-inflated state, is substantially circular as manmade underground passageways tend to be circular, however, it could be substantially square or rectangular shaped as manmade passageways above ground (e.g. air ventilation shafts) tend to be square or rectangular in shape.

It may be necessary to externally reinforce the bladder around the valve. As such, preferably, at least a portion of the thickness of the valve containing face of the bladder is thicker than the opposing face of the bladder. In fact, this may form part of the 'external means' described above This thicker portion could also be in the form of wadded straps or a "yoke" spanning the valve containing face of the bladder.

However, a circular strip of material formed from the same material as the bladder and radially extending from the valve could be used. Alternatively the entire valve containing face could be thicker than the opposing face.

Preferably, the fluid communication means is provided with a bend that is so curved as to allow the bladder containing portion of the blocking assembly to be inserted into a passageway whilst the remainder of the assembly remains substantially parallel with the entrance face of the passageway.

Although the bend could be a sharp elbow, preferably the shape of the bend is a smooth curve to maintain the structural integrity of the pipe as it curves.

Preferably the assembly is provided with a brace member adapted to overlie the mouth of the passageway that the assembly is to be used in conjunction with, the brace being so sized, shaped and configured as to allow the flow of fluid past it when in use.

According to a second aspect of the present invention there is provided a man made fluid inlet or outlet passage incorporating a blocking assembly as specified herein.

According to a third aspect of the present invention there is provided a vehicle incorporating a man made fluid inlet or outlet passage blocking assembly as specified herein.

Preferably the vehicle is an emergency vehicle selected from the group comprising fire engine, police car, life boat, helicopter and ambulance.

According to a fourth aspect of the present invention there is provided a method of using a blocking assembly as specified herein comprising the steps of:

placing the bladder of the assembly in the passageway to be blocked and actuating the assembly to inflate the bladder.

Preferably, the method further comprises the step of allowing unwanted fluid pressure to escape from the assembly to atmosphere.

Preferably, the method further comprises the step of stopping the escape of unwanted fluid pressure from escaping from the assembly to atmosphere manually.

Preferably, the method further comprises the step of removing unwanted fluid that the assembly in use, has prevented from moving down the passageway.

Preferably the method further comprises deflating and subsequently replacing the bladder once the need for the deployment of the assembly is over.

The invention includes within its scope a method substantially as herein described with reference to any appropriate selection or combination of the accompanying drawings.

The invention includes within its scope a blocking assembly substantially as herein described with reference to the accompanying drawings.

BRIEF DESCRIPTION OF THE DRAWINGS

Preferred embodiments of the present invention will now be more particularly described by way of example only, with reference to the accompanying sheets of drawings in which.

DESCRIPTION OF THE PREFERRED EMBODIMENTS

Figure 1:
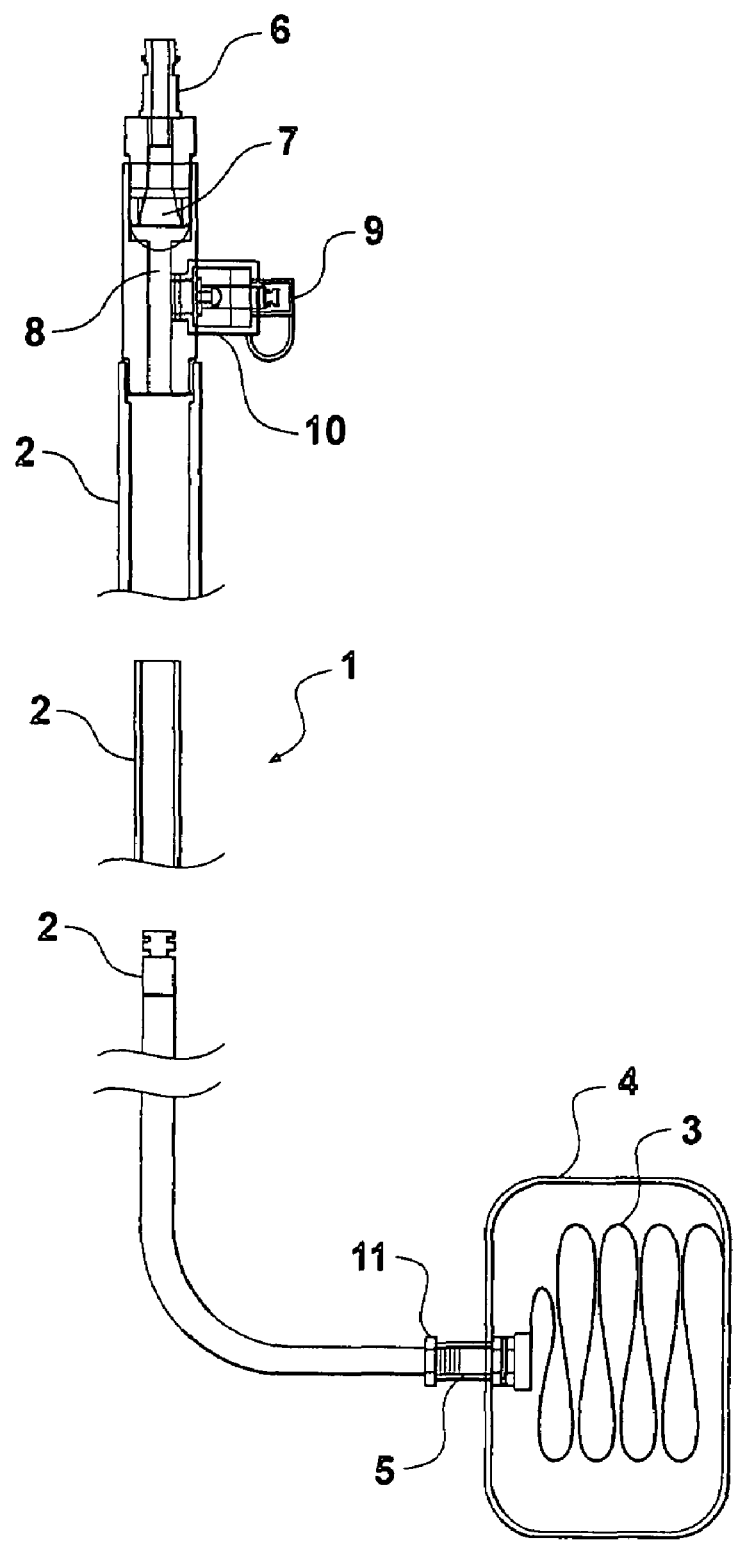
FIG. 1 illustrates a side elevation of a first embodiment of the present invention showing a portable blocking assembly suitable for use with high level ventilation shafts and underground drainage systems.

FIG. 1 shows a first embodiment of a blocking assembly of the present invention generally referenced (1). This embodiment is intended for use by the Emergency Services and as such is not supplied with its own pressurised gas cylinder. The slim portable blocking assembly (1) comprises three concentric substantially rigid polypropylene pipes (2) that are adapted to extend telescopically in the direction of the principal axis of the pipes (2).

Telescopic extension is achieved by extending each section of pipe (2) and rotating screw threaded "O" ring containing seals (not shown) located at respective distal ends of each pipe section (2) which expand the radius of each "O" ring seal to lock each section of the pipe (2) together in a fluid tight manner in the extended position.

This locking occurs because the O rings are effectively trapped within a screw threaded arrangement and a tightening of the thread squashes the "O" rings, making them bulge radially to squash against the internal wall of the pipe (2).

The lowermost pipe (2) is provided with a ninety degree gradual bend and is fitted at its distal end with a screw threaded valve receiving member (11). Attached to the valve receiving member (11), is a complementary screw threaded valve (5) (that is integral with an inflatable circular bladder (3), which is itself substantially enclosed within a frangible protective casing (4)) that protrudes from the casing (4) and is screwed into the member (11) in a fluid tight manner.

The proximal end of the lowermost piece of pipe (2) is connected to a concentrically larger middle section of pipe (2) which in turn is connected to a yet larger concentric upper most section (2) of pipe.

The proximal end of the uppermost pipe (2) is fitted with a male adapter (6) which is adapted to be connected to a Fire Service Breathing Apparatus (BA) pressurised gas cylinder. Below the adapter (6) and forming part of the uppermost pipe (2) is a non return valve (7) that is operatively connected in series to a pressure restrictor (8). In series and below the pressure restrictor (8) is a pressure relief valve (10) connected to a screwthreaded air release mechanism (9).

In use, in the event that the blocking assembly (1) is deployed, it is first fitted with a BA pressurised air cylinder (not shown) at adapter (6). The assembly (1) (if to be used to block off a storm drain) is then guided through a grate covering the storm drain and the bladder portion (3, 4, 5) is allowed to enter the inlet or outlet passage of whatever form of passageway that needs to be blocked by simultaneously extending the pipes (2) and then locking them so that they cannot telescopically alter in height along their principal axis as the assembly is guided through the grate and the BA cylinder is turned on.

At this point, air from the cylinder rushes through the adapter (6) entering the uppermost pipe (2) passing through the non-return valve (7) and through each of the sections of the pipe (2) through the valve (5) and as a result of the pressure restrictor (8), slowly begins to inflate the bladder (3). As the bladder (3) inflates, there comes a point where the bladder (3) bursts the frangible sections of the casing (4) and begins to take shape and fill the passageway entrance.

During this process, the assembly (1) position and more particularly the bladder (3) position tends to readjust its position automatically ensuring that substantially the centre of the bladder (3) remains concentric with the centre of the passageway.

Once the bladder (3) has grown to a sufficient size i.e. such that the sidewalls of the bladder (3) begin to grip the wall of the passageway, further re-positioning of the assembly (1) no longer occurs (or indeed is even possible by an operator of the assembly (1)) and the bladder (3) continues to grip the wall of the passageway with greater and greater pressure.

After a while, there comes a point where the pressure inside the bladder (3) is so large that the pressure relief valve (10) set to 8 Pounds per Square Inch (8 PSI) actuates and air is forced out of the air release mechanism (9). At this point, the operator of the blocking assembly (1) knows that the bladder (3) is at the correct pressure and turns off the BA cylinder.

The operator then tightens the air release mechanism (9) thus preventing the bladder (3) from deflating. The removal of the BA cylinder does not cause the air in the bladder (3) to escape because the non-return valve (7) prevents this from happening. The contaminants can then enter the storm drain and will not be able to pass across the passageway as it is now blocked in a substantially fluid tight manner by the bladder (3).

The bladder (3) is designed to withstand the pressure of fluid building up in the storm drain because the contaminant facing side of the inflated bladder (3), the valve (5) containing side is twice as thick as the opposing side, the seal securing both sides of the bladder (3) together forming part of the passage wall contacting surface of the bladder (3) when the bladder (3) is inflated. The ability to withstand this contaminant containing fluid pressure will enable the storm drain contaminants to be pumped out into oil drums for disposal.

After the "emergency" is over, the air release mechanism (9) is unscrewed allowing air to escape from the bladder (3), thus allowing the blocking assembly (1) to be removed. The bladder (3) is removed and replaced by a new bladder (3) and the assembly (1) is ready for use once more.

Figure 2:
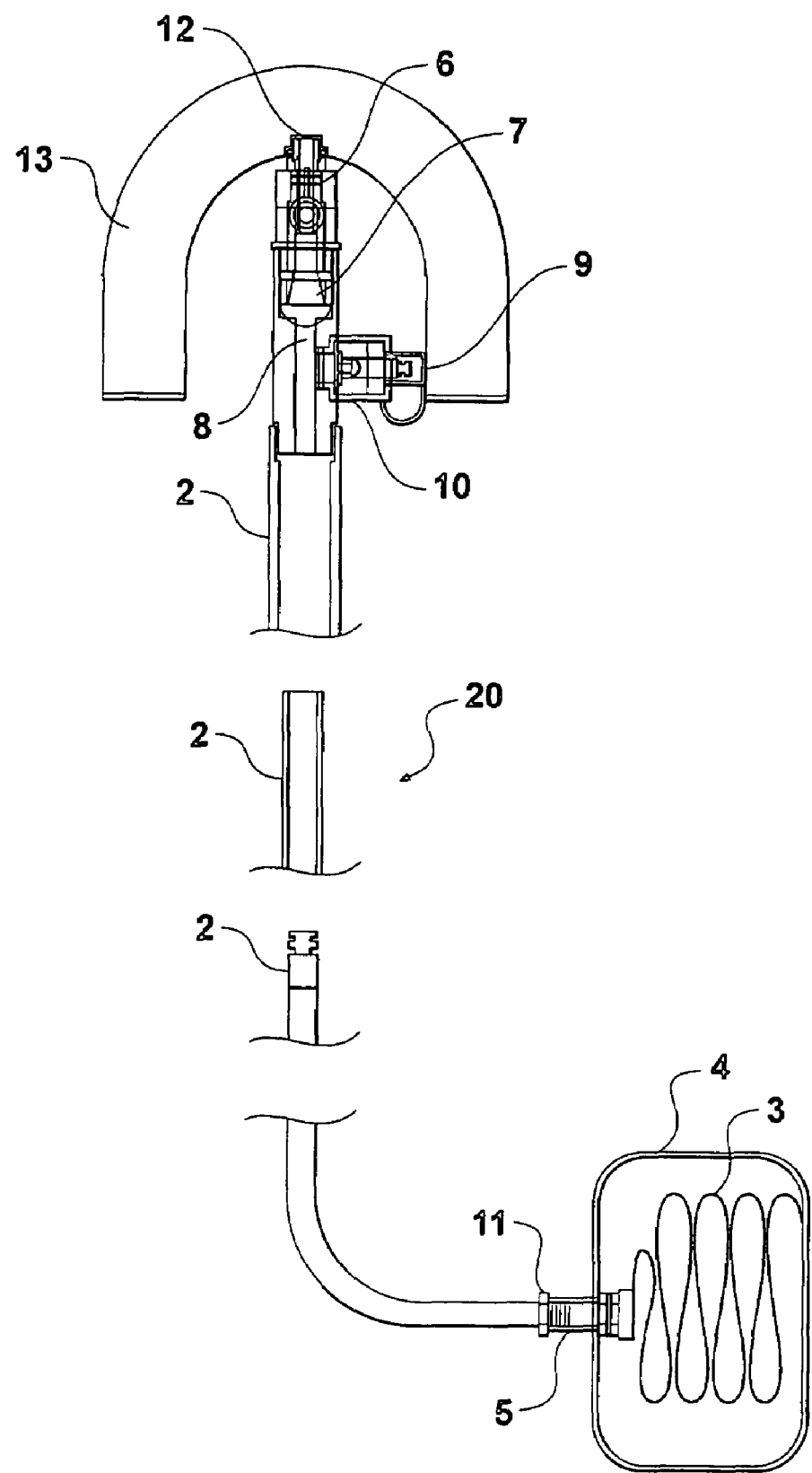
FIG. 2 illustrates a side elevation of a second embodiment of the present invention showing a portable blocking assembly suitable for use with high level ventilation shafts and underground draining systems incorporating an integral pressurised fluid supply.

Turning now to FIG. 2, this shows a second embodiment of the blocking assembly of the present invention and is generally referenced (20). To all intents and purposes, this embodiment incorporates all of the features of the first embodiment as shown in FIG. 1, except that the adaptor (6) also incorporates an actuation mechanism for the pressurised cylinder (13) and is now generally referenced (12) as a result. This embodiment incorporates the substantially "C" shaped pressurised nitrogen gas cylinder (13) fitted to the proximal end of the uppermost pipe (2) which contains a pre-determined amount of pressurised gas.

In use, the operation of the blocking assembly (20) is similar to the blocking assembly (1) however, with regards to the former, the pressurised air cylinder (13) is operated by a hand operable actuation mechanism (12) to inflate the bladder (3). Once the bladder reaches approximately 8 PSI, the pressure relief (10) actuates. Air is forced out of the air release mechanism (9), and when this occurs, the operator of the blocking assembly (20) shuts off the air cylinder (13) by closing off the actuation mechanism (12) and then tightens the air release mechanism (9) in the same way as the previous embodiment. Removal of the blocking assembly (20) after its use once it is no longer required is identical to that for the previously described embodiment.

Of course, for larger diameter passageways, a high pressure version of both of the previously described embodiments could be envisaged where the pipe (2) incorporates a pressure gauge and a far faster inflation rate for the bladder (3) could take place.

Figure 3:
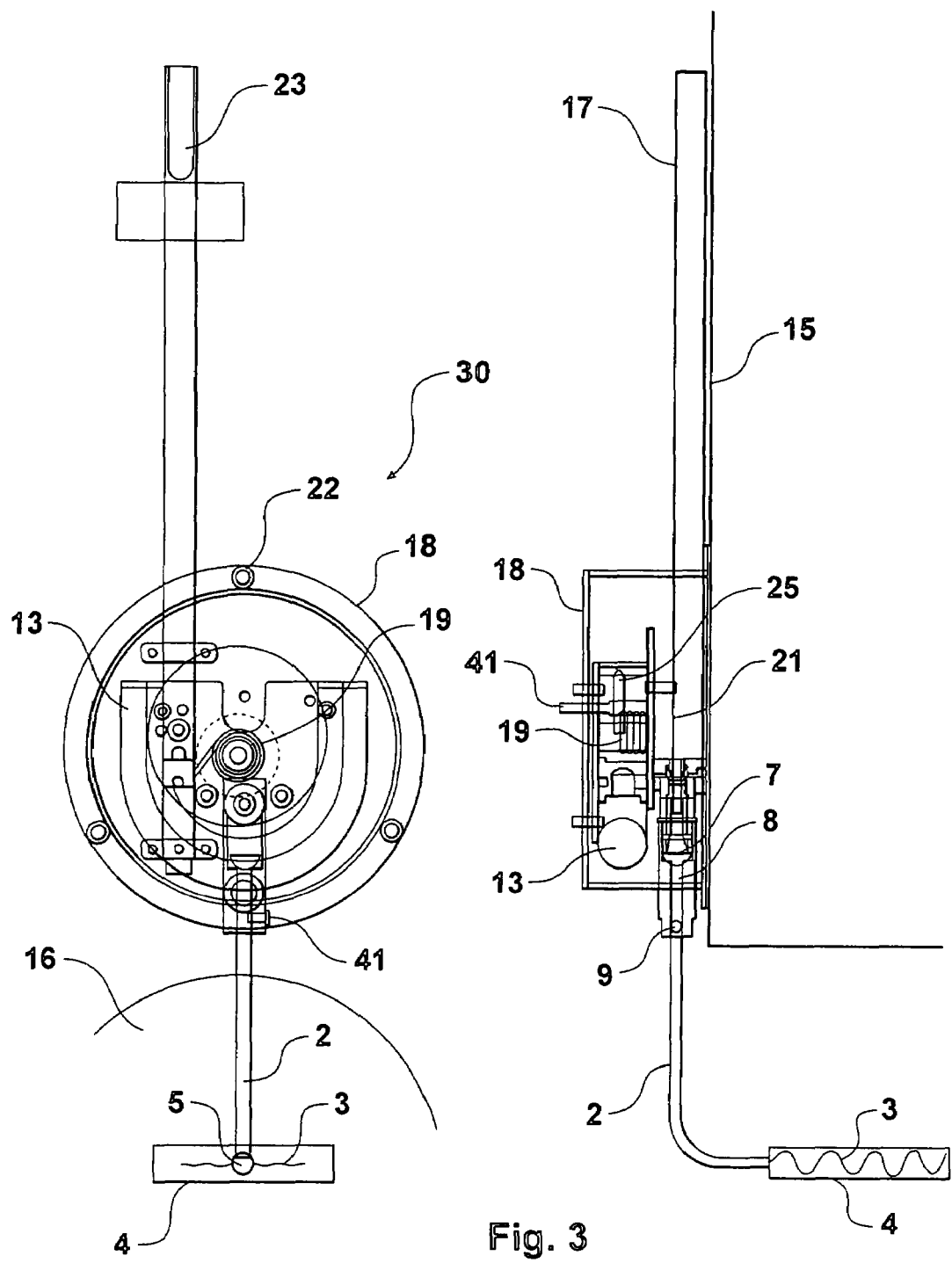
FIG. 3 illustrates a side elevation of a third embodiment of the present invention showing a self-contained blocking assembly fitted to a wall above and flush with a top of an entrance face of a man-made passageway the assembly being provided with means of actuating the assembly in a remote manner.

FIG. 3 illustrates a non-portable version of the present invention i.e. it is a pre-fitted to a structure ready for use as oppose to having to be carried to a scene of an emergency and the assembly of this embodiment is generally referenced (30). This particular embodiment is a self-contained assembly (30) adapted to be fitted to the wall (15) of a passageway (16) via screw threaded bolts (22) located around the circumferential periphery of a housing (18) that contains the assembly (30).

Instead of a series of extendible pipe section (2) only a single pipe section (2) equivalent to the lower most portion of the pipe section (2) in FIGS. 1 and 2 is provided that projects from the base of the housing (18).

As the assembly (30) is fitted to the wall (15) adjacent the entrance passage way (16), no extendible pipe sections (2) are required.

A tube (17) {containing a weight (23) located towards the top of the tube (17)} that is substantially flush with the wall (15) passes into the top face of the housing (18). The weight (23) is so sized and shaped to be able to slide down the tube (17) when it is required to do so. The weight (23) is maintained in its current position illustrated in FIG. 3 by a solenoid pin (not illustrated). Overlying the base of the tube (17) is a lever arm (21) that is operatively connected to a trigger mechanism (25).

The trigger mechanism (25) is itself operatively connected to a spring (19) and is designed to actuate the pressurised carbon dioxide cylinder (13) held within the housing (18). During transportation from the assembly's (40) point of manufacture to its site of deployment, to prevent its accidental actuation of the trigger mechanism (25) through a "jolt" of some kind, the assembly (40) is fitted with a screw-threaded "safety catch" (41) to lock the trigger mechanism (25) into place.

Once fitted, the safety catch (41) of the assembly (40) is unscrewed. This shifts the assembly (30) from its "safety "on" to it safety "off" position.

In use, at the first signs of a potential emergency requiring the passage (16) to be blocked, a signal is sent to the assembly (30) by a remote radio frequency signal which withdraws the solenoid pin allowing the weight (23) to descend down the tube (17) which upon contact with the lever arm (21) releases the trigger mechanism.

The released trigger mechanism then, under the influence of the spring (19) rotates around and actuates the pressurised air cylinder (13) which inflates the bladder (3) in a similar manner to that described previously. Such an actuation mechanism may be considered to be an indirect actuation mechanism.

In this particular embodiment, because the diameter of the passageway entrance (16) is already known, and tests have already been carried out, the cylinder (13) is already presupplied with the correct amount of air to enable the bladder (3) to inflate to the correct size and therefore does not require any form of pressure relief valve (10) whatsoever.

Deflating the bladder (3) will be through use of the air release mechanism (9) (although operators are also just as likely to use a knife to tear open the bladder (3) as in reality, each time any of the bladders (3) are used {probably for all of the embodiments described}, they will probably have to be replaced as their "wear and tear" upon deployment and general loss of "memory" is likely to render them more as a "use and lose" item rather than a "re-use" item).

Figure 4:
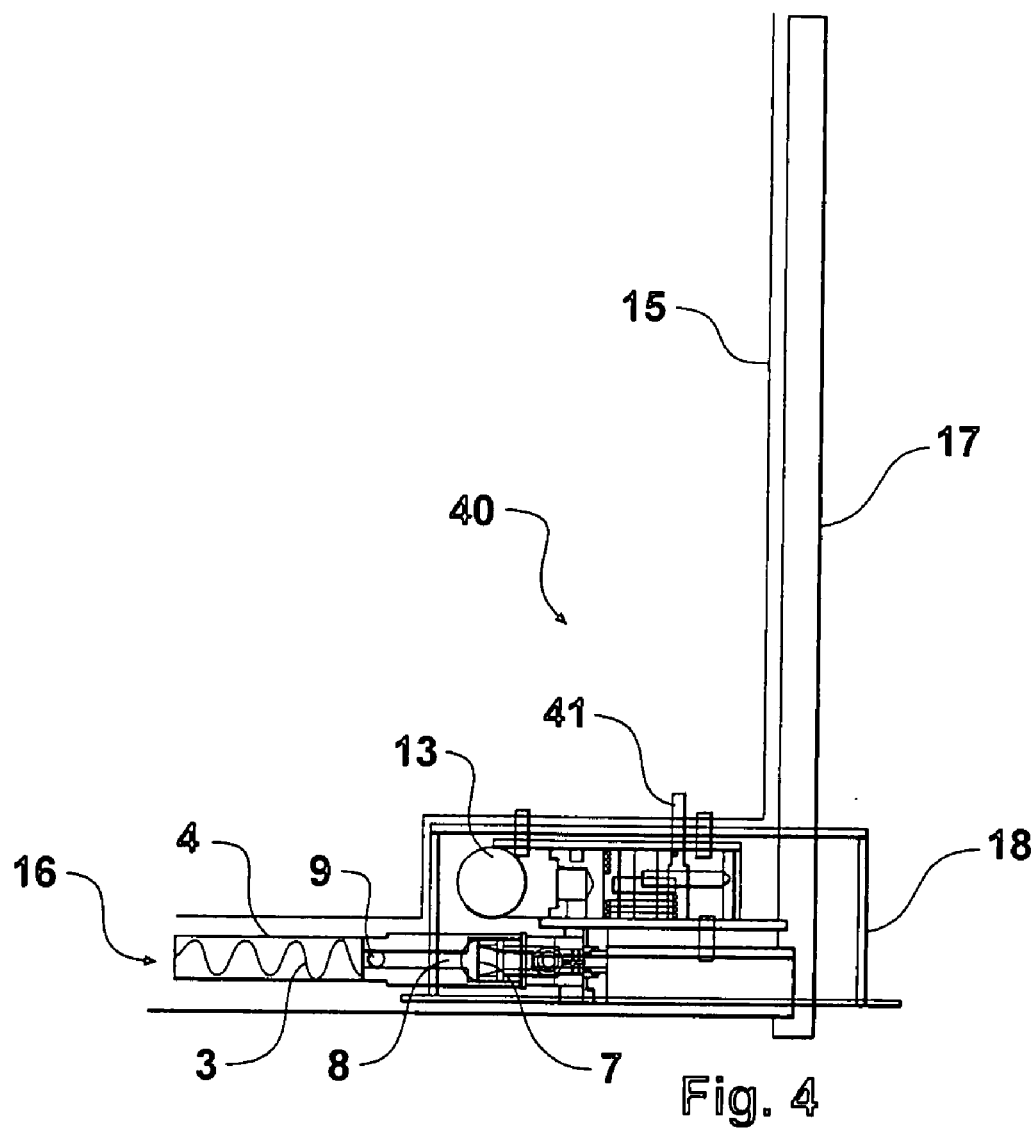
FIG. 4 illustrates a side elevation of a fourth embodiment of the present invention showing a self-contained blocking assembly recessed into a ceiling of a man-made passageway provided with means of actuating the assembly remotely.

Turning now to the fourth embodiment of the present invention, shown in FIG. 4, this is similar to the embodiment illustrated in FIG. 3, however in this particular case the embodiment generally referenced (40) is recessed into the ceiling of the passageway (16) adjacent to the entrance to the passage way (16).

As such, because the wall (15) contacting surface of the assembly (30) in FIG. 3 is now the base of the housing (18) in assembly (40) in FIG. 4, the tube (17), to be flush with the wall (15) now enters the top face of the housing (18) in assembly (40), the internals of the housing remaining otherwise substantially the same.

In FIG. 4, the pipe (2) has been replaced by a shorter straight pipe to the extent that the casing (4) contacts the housing (18) so now the casing (4) protrudes down the passageway (16) along a line that bisects the vertical diameter of the passageway (16) and instead of the weight (23) contacting the lower end of the arm (21) once the assembly (40) is actuated, it contacts the upper end of the lever arm (21) (instead of the lower end) and therefore actuates the assembly (40) in much the same way as the embodiment illustrated in FIG. 3.

In FIG. 4, the passageway (16) wall contacting surface of the bladder (3) will not be the seam containing portion of the bladder (3) once it deploys and inflates because the bladder (3) in this instance, being adjacent the upper surface of the passageway (16) will be rotated around through approximately ninety degrees.

Therefore, in this embodiment the thicker portions of the bladder (3) will again be the contaminant facing side of the inflated bladder (3) but this time, because of the rotation of the bladder (3), the thicker half of the bladder will be half the valve (5) containing portion and the half of the opposing face both linked by the common seam.

Figure 5:
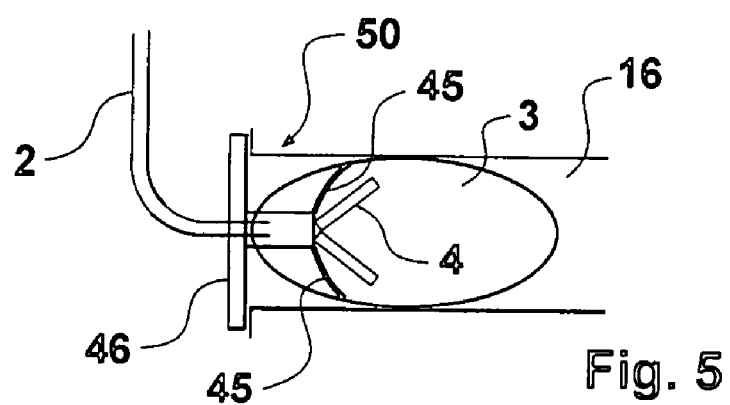
FIG. 5 illustrates a side elevation of a fifth embodiment of an assembly employing a brace and a different type of bladder, the brace and bladder being suitable for use with any appropriate other embodiment.

Turning now to FIG. 5, this shows another type of assembly generally referenced (50) that incorporates yet another type of bladder (3) which instead of having thicker halves of the bladder (3) just has thicker integral straps (or a yoke) (45) welded to the contaminant facing exterior side of the bladder (3).

In FIG. 5, the casing (4) has broken apart along its frangible sections as it is designed to do and the casing (4) being circumferencially linked to the valve (5), remains attached to the assembly (1,20,30,40,50) and acts as further protection for the bladder (3) against the pressure of the contaminants behind it when in use.

In addition, this embodiment of the assembly generally referenced (50) incorporates a "Y" shaped brace (46) used to span and overlie the mouth of the passageway (16). This particular embodiment is used solely for cases where the head of fluid behind the inflated bladder (3) is large as the brace (46) acts to hold the assembly (50) in place (when used e.g. for repairs downstream of the passageway (16)). This embodiment can also withstand a far higher head of water than previously described embodiments.

As and when the bladder (3) is deflated, the rush of fluid initially created between the gap between the bladder (3) and the wall of the passageway (16) is likely to take the assembly (50) downstream with the initial rush of fluid unless the brace (46) is there which also serves to protect the assembly (50) from moving during this initial surge of fluid.

Figure 6:
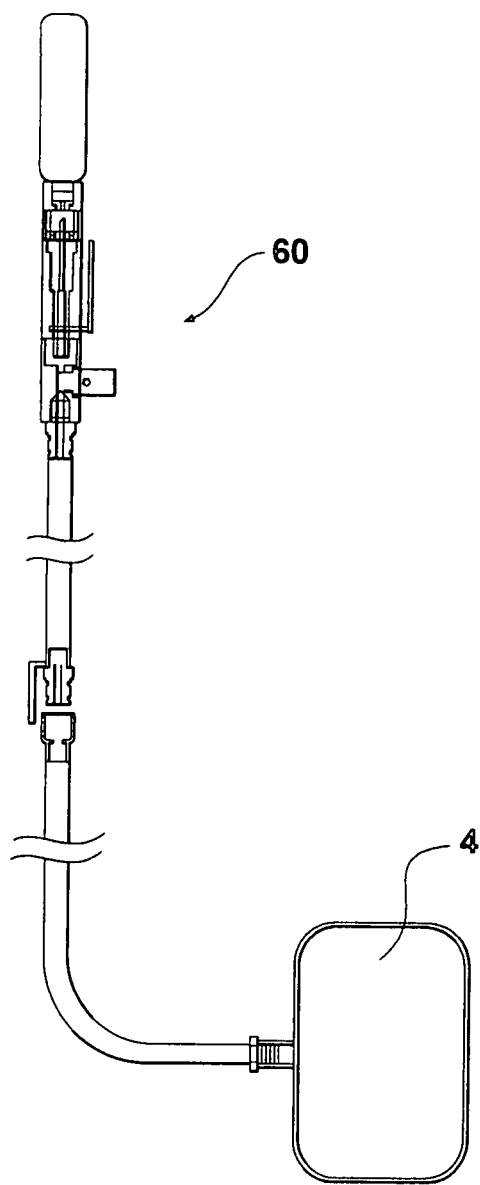
FIG. 6 illustrates a partial sectional view through a further embodiment of the present invention.

FIG. 6 shows a further embodiment of an assembly of the present invention generally referenced (60).

Figure 7:
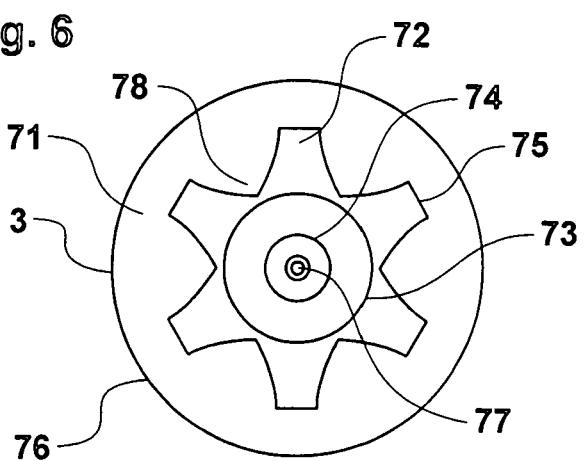
FIG. 7 illustrates a top view of a different type of bladder that can probably be used with most if not all of the embodiments described herein or otherwise envisaged.

FIG. 7 shows a front face of a further different type of bladder (3) formed from transparent polypropylene that can be used with most of the embodiments described herein. The bladder (3) is formed in part from a circular sheet of bladder forming material (71) having concentrically heat welded to it, a six sided substantially star shaped piece of similar material (72) (but of smaller diameter than the circular sheet (71)) via two concentric circular heat welds (73,74) as shown in FIG. 7.

The face (71) shown in FIG. 7 is the valve (77) containing face. A similar non valve containing portion of the bladder (3) is formed in the same way. Then the two halves of the soon to be formed bladder (3) are placed in completely overlying relationship with the star faces (72) in contiguous completely overlying relationship. Then each of the peripheral ends (75) of the mutually opposing stars are heat welded together before the two halves of the welded bladder forming sheets are then heat welded together along the circumferential periphery (76) of the circular sheets to form the completed uninflated bladder (3) shown in FIG. 7.

In use, when such a bladder (3) inflates, the internal six substantially evenly spaced apertures (78) of the substantially cylindrical tube generated maintains the integrity of the inflated bladder (3) and prevents the non passageway wall contacting ends of the bladder (3) from weakening and thus potentially further expanding on account of the fluid gas pressure within the bladder (3).

With such an inflated bladder (3), in a typical passageway where the bladder (3) is intended to be used, at least a height of 3.8 meters of water can be held back without the structural integrity of the bladder (3) being unduly compromised. In alternative embodiments of this particular bladder (3) (not illustrated), the smaller concentric weld (74) need not be present on the non valve containing side of the bladder (3). Similarly, for bladders (3) that need not be required to hold back as much head of water pressure, only four or even two usually evenly spaced apertures may be necessary.

Figure 8:
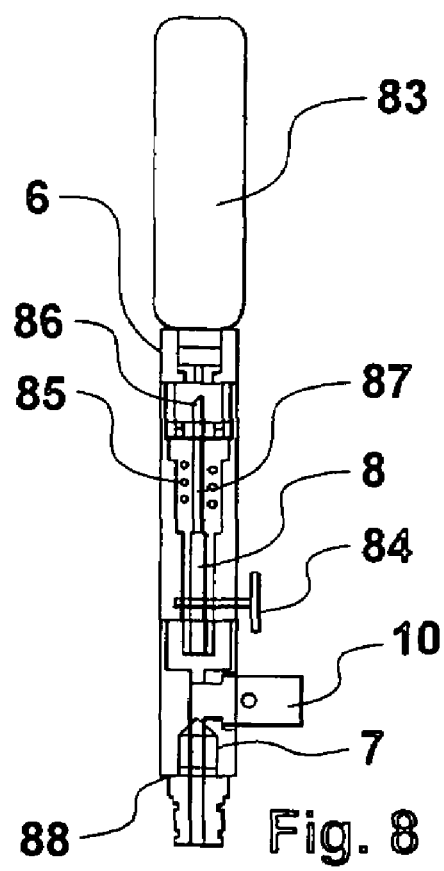
FIG. 8 illustrates a close up view of the compressed gas cylinder and the initial aspect of the assembly that it is attached to as illustrated in FIG. 6

FIG. 8 shows some of the important features of the assembly shown in FIG. 6 but in more detail. In FIG. 8 the elongate pressurised carbon dioxide gas cylinder (83) and an elongate compartment housing the actuation mechanism for the embodiment of FIG. 6 is shown in greater detail. The cylinder

(83) provided with a screw threaded head that is mated with adaptor (6) that in this embodiment is a centrally located female screw threaded portion on the top surface of the actuation mechanism in its normal attitude of operation.

It is to be appreciated that in this embodiment the passageway to be blocked may be a standard 150 mm across in diameter, but the cylinder (83) is of a standard type (i.e. it is intended to be supplied for an appropriate assembly that can be fitted to or used with any passageway type in the range of 150-300 mm. As such, it is pressurised to the level required for the largest diameter passageway irrespective of which type of passageway it is going to be used for. As such, a pressure relief valve (9) as shown in FIG. 8 is supplied Concentric with the female screw thread and located below it is a piercing pin (86) slidably located within a piercing pin shaft (87). The piercing pin (86) is biased into a retracted position through the use of a compression spring (85) and maintained in this biased position by an actuation lever (84). A flow restrictor (8) to regulate the flow of compressed gas into the bladder (3) is also provided as well as a non return valve (7) as indicated and of the type shown in previous embodiments.

The actuation lever (84) is substantially "L" shaped, the base of the "L" forming the actuation lever (84) and the upright portion of the "L" forming an actuation arm. In cross section, the lever (84) towards the actuation arm which is located externally of the assembly (60) is substantially circular. However, that portion of the lever (84) located internally of the assembly (60), in cross section is substantially semi circular on one side and flat on the other.

The curved semicircular side sits orthogonally proud of the piercing pin shaft (87) principal axis preventing the piercing pin (86) from moving up the shaft (87). Rotation of the actuation arm through 180 degrees in either direction, causes the flat side of the actuation lever (84) to appear in the shaft (87) in essence 'retracting' the lever (84) from a position that is proud of the circumferential periphery of the shaft (87) to one that is flush with the circumferential periphery of the shaft (87).

Such a movement will now allow the pin (86) to move relative to the shaft (87) on account of the biasing compression spring (85) no longer being biased. It will be seen that an air release mechanism (9) as shown in at least some of the previous embodiments is not shown in this particular embodiment. Instead there is a non return valve in the form of a check valve (88). With such an arrangement, any unwanted gas in the bladder is free to escape via the pressure relief valve (10) but the check valve automatically shuts off the escape of gas through the pressure relief valve (10) the moment that the bladder (3) is at the correct pressure.

Figure 9:
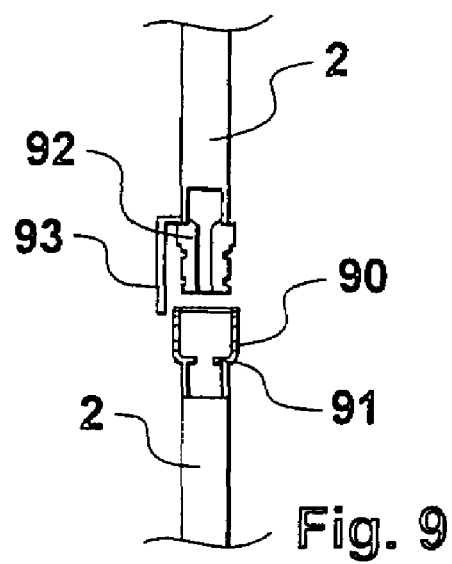
FIG. 9 illustrates a close up view of the connection used in the embodiment of FIG. 6 to connect two pieces of pipe together.

FIG. 9 shows some more of the important features of the assembly shown in FIG. 6 but in more detail. In FIG. 9, there is a close up of how the male-female connection of the pipes (2) forming the communication means in FIG. 6 is achieved.

The female distal end of the pipe (2) is provided with a concentric collar (90) that surrounds the exterior of the mouth of the pipe (2) and which has an integral cooperating member in the form of a pair of lugs (91) that downwardly depend from the collar (90) about the exterior of the pipe (2).

The male portion provided with a usual "O" ring seal is also provided at its proximal end with a concentric collar (92) that surrounds the exterior of the proximal end portion and which has an integral downwardly depending co-operating member (93) adapted to engage and lock with the lugs (91) located on the female portion to lock the two pieces of pipe (2) together.

Once so locked, rotation of one piece of pipe (2) about its longitudinal axis causes the other piece to rotate in the same direction and to the same extent instantaneously. The two pieces of pipe (2) have in this sense become one and are not able to move relative to each other.

However, male-female engagement of the pipes (2) can be executed without direct locking engagement of the cooperating members (91, 93). In other words the integral downwardly depending co-operating member (93) adapted to engage and lock with the lugs (91) located on the female portion can miss the lugs (91) and sit adjacent one instead of snugly between the pair of them.

In this case, rotation of either pipe (2) will not instantaneously cause the other pipe (2) to rotate, rather, rotation of the other pipe (2) will begin to occur one the integral downwardly depending co-operating member (93) adapted to engage and lock with the lugs (91) located on the female portion begins to contact the side of one of the lugs (91).

In operation, once the pipes (2) have been connected, the actuation lever (84) is rotated releasing the piercing pin (86) which travels up the piercing pin shaft (87) to pierce a cap of the cylinder (83). Regulated compressed gas then slowly inflates the bladder (3) which ruptures the frangible casing (4) in a manner previously described.

Figure 10:
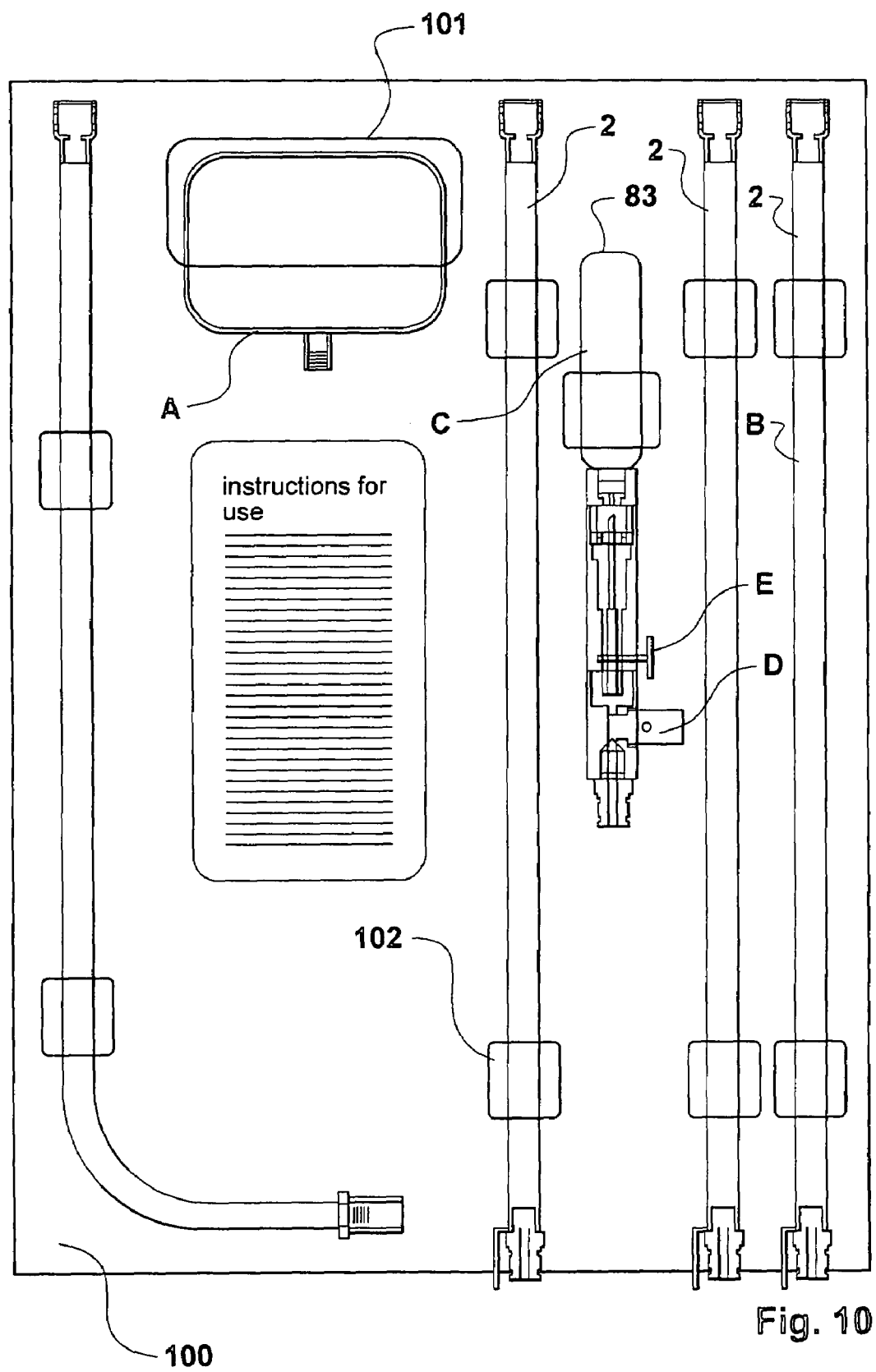
FIG. 10 illustrates a plan view of an unwrapped pack containing the components of the embodiment illustrated in figures

FIG. 10 shows the assembly (60) as sold in a self contained unwrapped plastics sheet (100), each of the components either being maintained in single or mutually opposing pockets (101) or sleeves (102), the sheet (100) being sold wrapped up in a spiral and tied with the tags (not illustrated).

Figure 11:
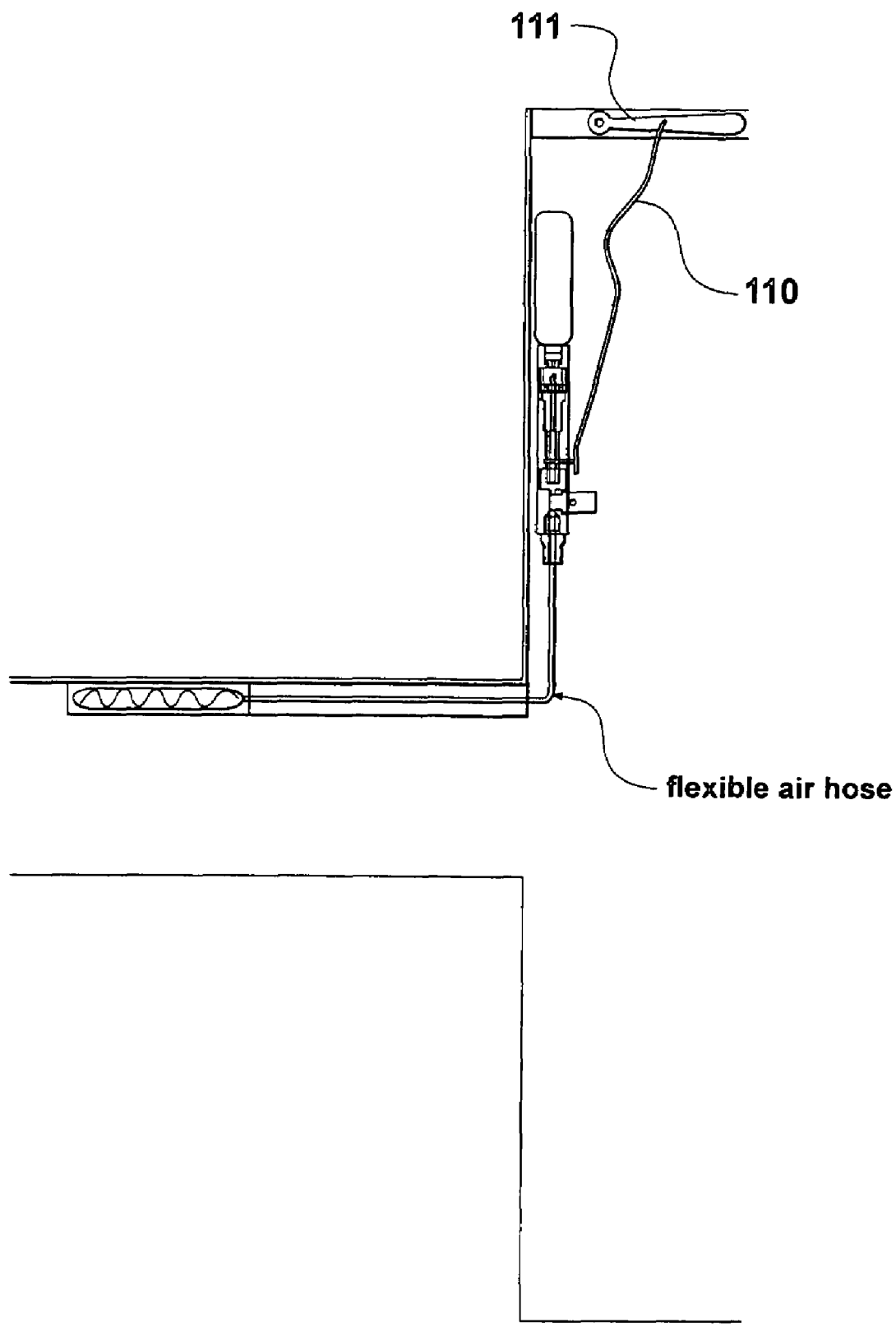
FIG. 11 illustrates yet another embodiment of the present invention.

FIG. 11 shows substantially the same embodiment of the assembly as shown in FIG. 6 but fitted to a side wall of a storm drain. The assembly actuation lever arm in this embodiment is a wheel that is connected to a cable (110) which in turn is fitted to a hand operable lever (111) located at the surface of the storm drain thus enabling ease of operation of the assembly when required. The hand operable lever (111) could be fitted anywhere provided that the cable (110) connecting it to the actuation lever (111) was long enough. Actuation of the lever will cause the wheel to rotate which in turn will drive the pin (86) into the cylinder (83).

FIG. 6 shows an assembly (60) with a so-called direct actuation mechanism that has a directly hand operable switch that is directly integral with the assembly (60). On the other hand, FIG. 11, although another example of a so-called direct actuation mechanism incorporates an indirectly hand operable switch that is operatively connected to the assembly and may even be considered to be integral to the assembly but is not directly integral with it, it is somewhat remote.

The last two embodiments described (FIGS. 6-11) show assemblies that negate the need to rely on complex or indeed even simple electronics which may fail over time if kept in the type of environment normally associated with for example storm drains.

Throughout the description and claims of this specification the word "comprise" and variations of that word, such as "comprises" and "comprising", are not intended to exclude other additives, components, integers or steps.

Throughout this specification the use of the word "integral" is intended to cover not only something that is formed from the outset as one single-entity component but also anything whilst being assembled from a plurality of initially disparately-produced integers, ends up as one overall and normally non-dismantlable structure.

An instruction manual outlining the use of the embodiment shown in FIGS. 6-10 of the present invention is attached below.

Intended Use

This drain blocker has been designed to be used to block discharge pipes within cesspits and manholes to prevent spills from entering waste waterways. The blocking device, using an inflatable airbag, is effective with discharge pipes ranging in size from 150 mm to 300 mm. The spill is effectively contained within the cesspit or manhole and backs up inside the inlet pipe (if connected) thereby containing the spill so that it can be safely pumped out and disposed of. The airbag material used is impervious to most chemicals, oils, acids and alkalis. The depth of the discharge pipe can be up to 2 meters deep and the device has been tested to hold back that level of spill.

Operating Instructions

Unpack the required components contained in the carry bag. Connect the bag case (A) to the aluminium extension with the 90 deg bend. Then attach as many tube extensions (B) required to reach the discharge pipe. Next, attach the cylinder unit (C) complete with the pressure relief valve (D) and triggering lever (E)

Drop the bag unit and tube down through the cesspit grate—the side closest to the discharge pipe end. If the cesspit grate slots are less than 24 mm, i.e. too narrow for the bag to drop through, the grate must be lifted. When you feel the bag reach the discharge pipe, rotate the top tube so that the bag case fully enters the discharge pipe then the air cylinder can be activated by turning the triggering lever (E) 180 degrees in any direction. The air will slowly be released into the airbag to inflate it.

Depending on the diameter of the discharge pipe, air pressure inside the bag will reach a point where surplus air is released via the pressure relief valve, this is normal—just let all the air release from the cylinder. This will take about 60 seconds. After about that time you will hear the air being discharged start to slow, the airbag will now be fully inflated Cleanup can now commence. During the bag filling process the cylinder will get quite cold and ice may form around certain parts of the mechanism. This is quite normal.

Once the spill has been cleaned up and pumped out of the cess pit, the airbag can be deflated. Simply disconnect the cylinder unit (C) from the top tube extension (B). When the air has been released from the bag the unit can be withdrawn through the grate cleaned up and serviced with a new cylinder attached. Refer to installation instructions provided with the replacement cylinder. Note that only genuine replacement cylinders and air bags must be used otherwise the device will not operate properly.

Warnings and Warranties

Bags can only be used once. When deployed, the bags stretch and lose their inflation and sealing characteristics and so cannot be reused effectively. Once used, the air cylinder needs to be replaced. Order replacement airbags and cylinders from Inflation Technologies Limited or its local distributor.

Every effort has been made to ensure that this unit will effectively seal discharge pipes as specified above, but due to possible circumstances outside our control such as the condition of the discharge pipe, interference with the unit affecting the predetermined settings or failing to follow the instructions above, the unit may not operate as it was designed to do. Therefore, Inflation Technologies Limited cannot accept any responsibility for any situation where the unit does not effectively block pipes able and intended to be blocked by this device.

The invention claimed is:

1. A man made fluid inlet or outlet passage blocking assembly comprising:
    an inflatable bladder operatively linked to a fluid communication means comprising a pipe, one aspect of the fluid communication means being adapted to receive a pressurized fluid supply, wherein
    when the pressurized fluid passes through the fluid communication means, the bladder is adapted to inflate to block the passage in a fluid tight manner,
    the pipe is provided with a bend that is so curved and of sufficient length as to allow the bladder containing portion of the assembly to be inserted into a passageway while the remainder of the assembly remains substantially parallel with the entrance face to the passageway, and
    the fluid communication means is extendable telescopically.

2. A man made fluid inlet or outlet passage blocking assembly comprising:
    an inflatable bladder operatively linked to a fluid communication means comprising a pipe, one aspect of the fluid communication means being adapted to receive a pressurized fluid supply, wherein
    when the pressurized fluid passes through the fluid communication means, the bladder is adapted to inflate to block the passage in a fluid tight manner,
    the pipe is provided with a bend that is so curved and of sufficient length as to allow the bladder containing portion of the assembly to be inserted into a passageway while the remainder of the assembly remains substantially parallel with the entrance face to the passageway,
    the bladder is provided with means in the form of an internal or external bladder reinforcing member adapted to assist in maintaining the structural integrity of the bladder once it has been inflated, and
    the internal bladder reinforcing member operatively links opposing internal faces of the bladder.

3. A method of forming a man made fluid inlet or outlet passage, blocking assembly reinforced bladder for use with a man made fluid inlet or outlet passage blocking assembly, said method comprising:
    linking a first number of reinforcing members to a first bladder forming member via a number of welds;
    linking a second number of reinforcing members to a second bladder forming member via a number of welds;
    linking the first and second numbers of reinforcing members together via a number of welds; and linking the first and second bladder forming members together via a number of welds,
    wherein said assembly comprises a man made fluid inlet or outlet passage blocking assembly comprising:
    an inflatable bladder operatively linked to a fluid communication means comprising a pipe, one aspect of the fluid communication means being adapted to receive a pressurized fluid supply, wherein
    when the pressurized fluid passes through the fluid communication means, the bladder is adapted to inflate to block the passage in a fluid tight manner, and
    the pipe is provided with a bend that is so curved and of sufficient length as to allow the bladder containing portion of the assembly to be inserted into a passageway while the remainder of the assembly remains substantially parallel with the entrance face to the passageway.

4. The method as claimed in claim 3, wherein completion of the welding to form the finished reinforced bladder is from a single continuous weld.

5. The method as claimed in claim 3, wherein the number of welds linking a first number of reinforcing members to a first bladder forming member is either one or two.

6. A man made fluid inlet or outlet passage blocking assembly comprising:

an inflatable bladder operatively linked to a fluid communication means, one aspect of the fluid communication means being adapted to receive a pressurized fluid supply, wherein, when a pressurized fluid passes through the fluid communication means, the bladder is adapted to inflate to block the passage in a fluid tight manner, and wherein the fluid communication means is formed from a plurality of elongate pipes adapted to operatively engage when connected together, so that when connected, at least two pipes lock together to the extent that rotation about the primary axis of the communication means by a single connected pipe causes rotation in the same direction of at least one of the other connected pipes.

7. The assembly as claimed in claim 6, wherein the rotary action of the or each connected pipe when a single member of the connected pipes is rotated, is substantially instantaneous.

8. A man made fluid inlet or outlet passage blocking assembly comprising:

an inflatable bladder operatively linked to a fluid communication means, one aspect of the fluid communication means being adapted to receive a pressurized fluid supply, wherein, when the pressurized fluid passes through the fluid communication means, the bladder is adapted to inflate to block the passage in a fluid tight manner, and a frangible housing or protective cover about the bladder, wherein the housing or protective cover is connected to the fluid communication means in a manner such that the housing remains connected to the fluid communication means after the housing or protective cover is ruptured in use.

* * * * *